(12) United States Patent
Uramoto et al.

(10) Patent No.: US 9,219,379 B2
(45) Date of Patent: Dec. 22, 2015

(54) ELECTRONIC APPARATUS, POWER FEEDING METHOD, AND POWER FEEDING SYSTEM

(75) Inventors: Yoichi Uramoto, Kanagawa (JP); Masayuki Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 228 days.

(21) Appl. No.: 13/137,773

(22) Filed: Sep. 12, 2011

(65) Prior Publication Data

US 2012/0091993 A1 Apr. 19, 2012

(30) Foreign Application Priority Data

Oct. 15, 2010 (JP) .................................. 2010-232814

(51) Int. Cl.
| | | |
|---|---|---|
| *G01R 27/02* | (2006.01) | |
| *H02J 7/02* | (2006.01) | |
| *H04B 5/00* | (2006.01) | |
| *G01V 3/10* | (2006.01) | |
| *H01F 38/14* | (2006.01) | |

(52) U.S. Cl.
CPC ................ *H02J 7/025* (2013.01); *G01V 3/101* (2013.01); *H04B 5/0037* (2013.01); *H04B 5/0081* (2013.01); *H01F 38/14* (2013.01)

(58) Field of Classification Search
CPC ..... H04B 5/0081; H04B 5/0037; H02J 7/025; H01F 38/14
USPC ........................ 324/76.75, 654, 655, 658, 686
See application file for complete search history.

(56) References Cited

U.S. PATENT DOCUMENTS

| | | | |
|---|---|---|---|
| 6,404,192 B1* | 6/2002 | Chiesi et al. ................... | 324/253 |
| 8,104,358 B1* | 1/2012 | Jia et al. .......................... | 73/780 |
| 2008/0129629 A1* | 6/2008 | Kimura et al. ................. | 343/788 |
| 2008/0164839 A1 | 7/2008 | Kato et al. | |
| 2008/0303517 A1* | 12/2008 | Skultety-Betz et al. ....... | 324/234 |
| 2009/0040003 A1* | 2/2009 | Huang et al. ................. | 336/84 M |
| 2009/0079387 A1* | 3/2009 | Jin et al. ........................ | 320/108 |
| 2009/0267558 A1* | 10/2009 | Jung ............................. | 320/108 |
| 2010/0013321 A1 | 1/2010 | Onishi et al. | |
| 2010/0060300 A1* | 3/2010 | Muller et al. ................. | 324/686 |
| 2010/0084918 A1 | 4/2010 | Fells et al. | |
| 2010/0181842 A1* | 7/2010 | Suzuki et al. ................. | 307/104 |
| 2010/0288418 A1* | 11/2010 | Yang et al. .................... | 156/62.2 |
| 2010/0289448 A1* | 11/2010 | Jung et al. ..................... | 320/108 |

(Continued)

FOREIGN PATENT DOCUMENTS

| | | |
|---|---|---|
| CN | 101304178 | 11/2008 |
| CN | 101572421 | 11/2009 |

(Continued)

OTHER PUBLICATIONS

Dictionary of Scientific and Technical Terms, Sixth Edition, McGraw-Hill, 2002, p. 456.*

(Continued)

*Primary Examiner* — Vinh Nguyen
*Assistant Examiner* — Dustin Dickinson
(74) *Attorney, Agent, or Firm* — Hazuki International, LLC

(57) ABSTRACT

Disclosed herein is an electronic apparatus, including an electric power receiving portion receiving an electric power from a power feeding apparatus by using a magnetic field, and a detecting portion detecting presence or absence of a foreign object between said power feeding apparatus and said detecting portion.

25 Claims, 12 Drawing Sheets

(56) References Cited

U.S. PATENT DOCUMENTS

| | | | |
|---|---|---|---|
| 2010/0292945 A1* | 11/2010 | Reynolds et al. | 702/65 |
| 2010/0328044 A1* | 12/2010 | Waffenschmidt et al. | 340/10.4 |
| 2011/0050191 A1* | 3/2011 | Tsuji et al. | 323/282 |
| 2012/0091989 A1* | 4/2012 | Uramoto et al. | 324/76.11 |

FOREIGN PATENT DOCUMENTS

| | | |
|---|---|---|
| EP | 2 017 940 A2 | 1/2009 |
| JP | 09-285143 | 10/1997 |
| JP | 11-176677 | 7/1999 |
| JP | 2000-134830 A | 5/2000 |
| JP | 2002-034169 | 1/2002 |
| JP | 2003-009410 A | 1/2003 |
| JP | 2005-502886 A | 1/2005 |
| JP | 2008-172874 | 7/2008 |
| JP | 2009-277690 A | 11/2009 |
| JP | 2010-213414 A | 9/2010 |
| JP | 2012-016125 A | 1/2012 |
| JP | 2012-504931 A | 2/2012 |
| WO | WO-2010/040015 A2 | 4/2010 |

OTHER PUBLICATIONS

Extended European Search Report issued Mar. 5, 2012 for corresponding European Application No. 11 18 4188.

Japanese Office Action issued Jul. 8, 2014 for corresponding Japanese Application No. 2010-232814.

Chinese Office Action issued Sep. 28, 2014 for corresponding Chinese Application No. 201110314458.0.

* cited by examiner

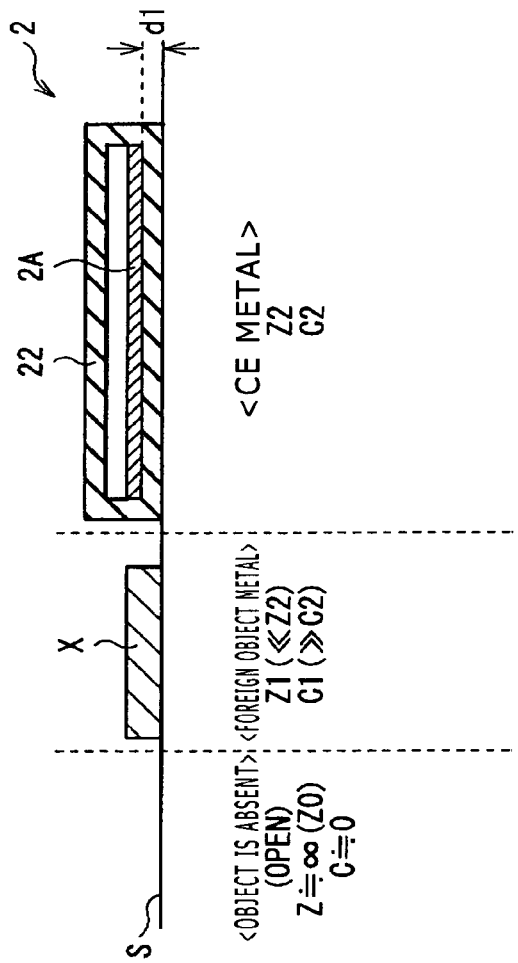
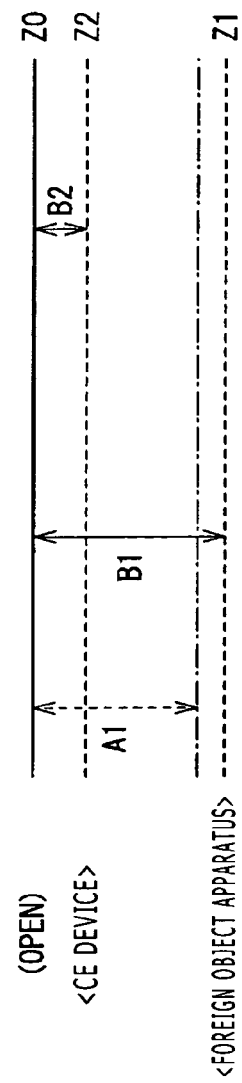
FIG. 5A
FIG. 5B

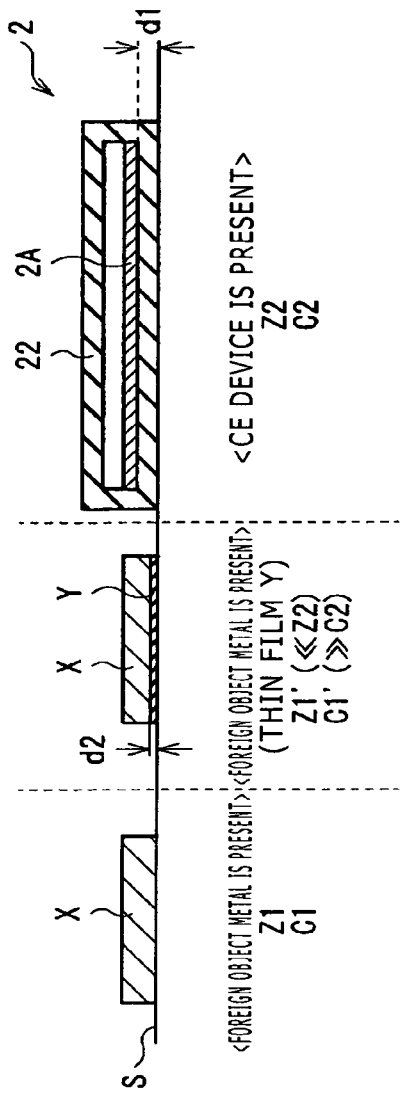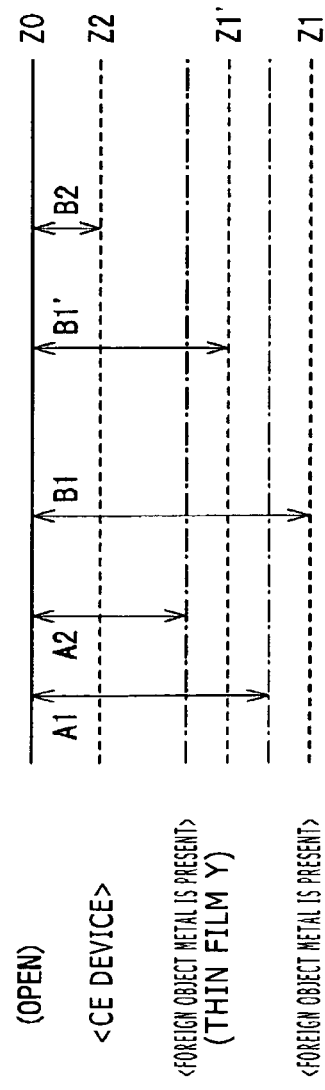
FIG. 7A
FIG. 7B

ELECTRONIC APPARATUS, POWER FEEDING METHOD, AND POWER FEEDING SYSTEM

BACKGROUND

The present disclosure relates to an electronic apparatus, a power feeding method, and a power feeding system which can supply an electric power, for example, in a non-contact manner.

In recent years, a power feeding apparatus (such as a non-contact power feeding apparatus or a wireless power feeding apparatus) for supplying an electric power to a Consumer Electronics (CE) Device such as a mobile phone or a portable music player in a non-contact manner by utilizing electromagnetic induction, magnetic sympathetic resonance or the like has received attention. As a result, the charging is not started by inserting (connecting) a connector of a power source device such as an AC (alternating current) adaptor into (to) an apparatus, but the charging can be started by placing the apparatus on a tray type power feeding apparatus (charging tray). That is to say, the terminal connection becomes unnecessary between the CE device and the power feeding apparatus.

In the power feeding apparatus, since the charging is started by placing the CE device on the charging tray as described above, it is possible to lighten a burden imposed on a user. On the other hand, however, the power feeding apparatus involves a disadvantage that an object other than the device as an object of the charging, for example, a foreign object such as a ten-yen coin (foreign object metal) is readily placed on the charging tray. When such a foreign object metal is placed on the charging tray, there is the possibility that the foreign object metal is heated. In particular, when the foreign object metal is wedged between the tray and the CE device, the temperature in this case becomes higher than that in the case where the foreign object metal is merely placed.

Then, heretofore, for the purpose of taking measures such that the charging is stopped when there is such a foreign object metal, and so forth, various kinds of techniques for detecting the foreign object metal on the charging tray have been proposed. For example, there has been proposed a technique for detecting a temperature of an object placed on the charging tray, and judging that the object is a foreign object when an abnormal temperature rise is confirmed. This technique, for example, is described in Japanese Patent Laid-Open No. 2008-172874 (referred to as Patent Document 1 hereinafter). In addition, there has also been proposed a technique for charging a load so as to follow a predetermined pattern, thereby detecting an over-load. This technique, for example, is described in Japanese Patent Laid-Open No. 2002-34169 (referred to as Patent Document 2 hereinafter).

SUMMARY

However, with the technique described in Patent Document 1, it is judged that the object placed on the charging tray is the foreign object based on the abnormal temperature rise. Therefore, it may not prevent the temperature rise of the foreign object, and thus the technique does not become an ultimate solution. In addition, with the technique described in Patent Document 2, it is difficult to precisely judge whether the change in the load is due to the CE device or due to an influence of the foreign object metal. Although the various kinds of techniques have been proposed as the technique for detecting the foreign object in such a manner until now, it is desired to realize a new foreign object detecting device which is completely different from any of the existing techniques.

The present disclosure has been described in order to solve the problems described above, and it is therefore desirable to provide an electronic apparatus, a power feeding method, and a power feeding system which can precisely detect a foreign object, thereby preventing anomalous heating of the foreign object when power feeding is carried out by using a magnetic field.

In order to attain the desire described above, according to an embodiment of the present disclosure, there is provided an electronic apparatus including: an electric power receiving portion receiving an electric power from a power feeding apparatus by using a magnetic field; and a detecting portion detecting presence or absence of a foreign object between the power feeding apparatus and the detecting portion.

It should be noted that in the present disclosure and this specification, the term of "the foreign object" means an object (such as a metallic object) different from each of the power feeding apparatus and the electronic apparatus.

According to another embodiment of the present disclosure, there is provided a power feeding method including: detecting presence or absence of a foreign object between a power feeding apparatus and an electronic apparatus in the electronic apparatus when an electric power is transmitted from the power feeding apparatus to the electronic apparatus.

According to still another embodiment of the present disclosure, there is provided a power feeding system including: an electronic apparatus; and a power feeding apparatus feeding an electric power to the electronic apparatus. The electronic apparatus includes: an electric power receiving portion receiving an electric power from the power feeding apparatus by using a magnetic field; and a detecting portion detecting presence or absence of a foreign object between the power feeding apparatus and the detecting portion.

In the embodiments of the present disclosure, in the electronic apparatus, presence or absence of the foreign object between the power feeding apparatus and the electronic apparatus is detected, which results in that when the foreign object is present, it, for example, is possible to take measures to stop or reduce the feeding of the electric power to the electronic apparatus.

As set forth hereinabove, according to the present disclosure, when the electric power is fed from the power feeding apparatus by using the magnetic field, whether or not the foreign object is present between the power feeding apparatus and the electronic apparatus is detected in the electronic apparatus. As a result, when the foreign object is present, it, for example, is possible to take measures to stop or reduce the feeding of the electric power to the electronic apparatus. Therefore, when the power feeding is carried out by using the magnetic field, the foreign object can be precisely detected, and thus the anomalous heating of the foreign object can be prevented.

BRIEF DESCRIPTION OF THE DRAWINGS

FIGS. 5A and 5B are respectively a schematic view explaining an operation for detecting a foreign object metal in a state of disposition of an object on an upper surface of the charging tray, and a schematic view explaining the operation for detecting the foreign object metal in accordance with a relationship between an amount of change in a parameter, and a threshold;

FIGS. 7A and 7B are respectively a schematic view explaining an operation for detecting a foreign object metal of Modification Example 1 in a state of disposition of an object on an upper surface of the charging tray, and a schematic view explaining the operation for detecting the foreign object metal of Modification Example 1 in accordance with a relationship between an amount of change in a parameter, and a threshold, and including the case where a thin film is formed on the upper surface of the tray (on an electrode);

DETAILED DESCRIPTION OF THE PREFERRED EMBODIMENTS

Embodiments of the present disclosure will be described in detail hereinafter with reference to the accompanying drawings. It is noted that the description will be given below in accordance with the following order:

1. Embodiment (the case of a charging tray in which point-like positive and negative electrodes are alternately, discretely disposed);

2. Modification Example 1 (the case of a foreign object detecting operation using two thresholds);

3. Modification Example 2 (the case of a foreign object detecting operation using a resonance circuit);

4. Modification Example 3 (the case where line-like positive and negative electrodes are alternately, discretely disposed);

5. Modification Example 4 (the case where lattice-like positive and negative electrodes are alternately, discretely disposed);

6. Modification Example 5 (the case where comb teeth-like positive and negative electrodes are disposed so as to be engaged with each other); and 7. Modification Example 6 (the case where annular positive and negative electrodes are alternately, concentrically disposed).

<Embodiment>
[Entire Construction]

Figure 1:
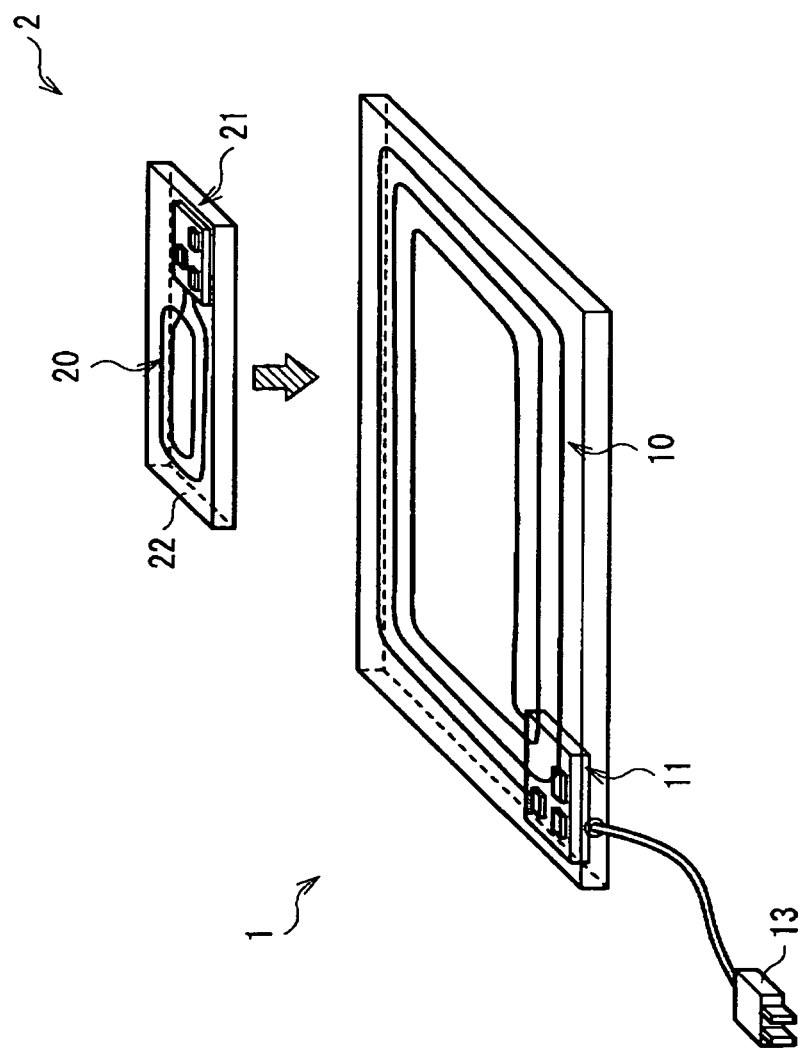
FIG. 1 is a perspective view showing a schematic construction of a charging tray and a mobile phone in a power feeding system according to an embodiment of the present disclosure.

FIG. 1 shows a schematic construction of a power feeding system according to an embodiment of the present disclosure. The power feeding system includes a charging tray 1 (power feeding apparatus) and a mobile phone 2 (electronic apparatus). The power feeding system is a so-called non-contact type power feeding system in which the mobile phone 2 is placed on (or comes close to) an upper surface of the charging tray 1, thereby charging the mobile phone 2 with the electricity. It is noted that since a power feeding method in the present disclosure is embodied by a power feeding operation in the charging tray 1 and the mobile phone 2, a description is omitted here.

The charging tray 1 includes a primary coil 10 and a circuit portion 11. In this case, an electric power is fed through the primary coil 10 by using a magnetic field. Also, the circuit portion 11 controls the driving of the primary coil 10. The charging tray 1, for example, is provided with a power source plug 13 through which the charging tray 1 is connected to an AC power source. The primary coil 10 either may be provided inside a chassis in the charging tray 1, or may be disposed on the surface of the charging tray 1 to be coated with a resin. A voltage, for example, is supplied from the AC power source to both ends of the primary coil 10 through both of the circuit portion 11 and the power source plug 13. As a result, in the vicinity of the surface of the charging tray 1, an electromagnetic wave is radiated toward a center within the surface of the charging tray 1 (a magnetic field is generated).

The mobile phone 2 includes a secondary coil 20 and a circuit portion 21 within a chassis 22. In this case, the secondary coil 20 is paired with the primary coil 10 in the charging tray 1. Also, the circuit portion 21 controls the drive of the secondary coil 10 and includes a detecting circuit 21A which will be described later. The mobile phone 2, for example, is provided with an alarm lamp (not shown). By lighting the alarm lamp, it is possible to make (offer) the announcements that a foreign object is wedged between the charging tray 1 and the mobile phone 2 to a user. An electric power is supplied from the charging tray 1 side to the mobile phone 2 side by an electromagnetic induction (or a magnetic sympathetic resonance) in the primary coil 10 and the secondary coil 20. Such a mobile phone 2 is provided with an electrode pattern (which will be described in detail below) for detection of the foreign object.

(Detailed Structure of Mobile Phone 2)

Figure 2:
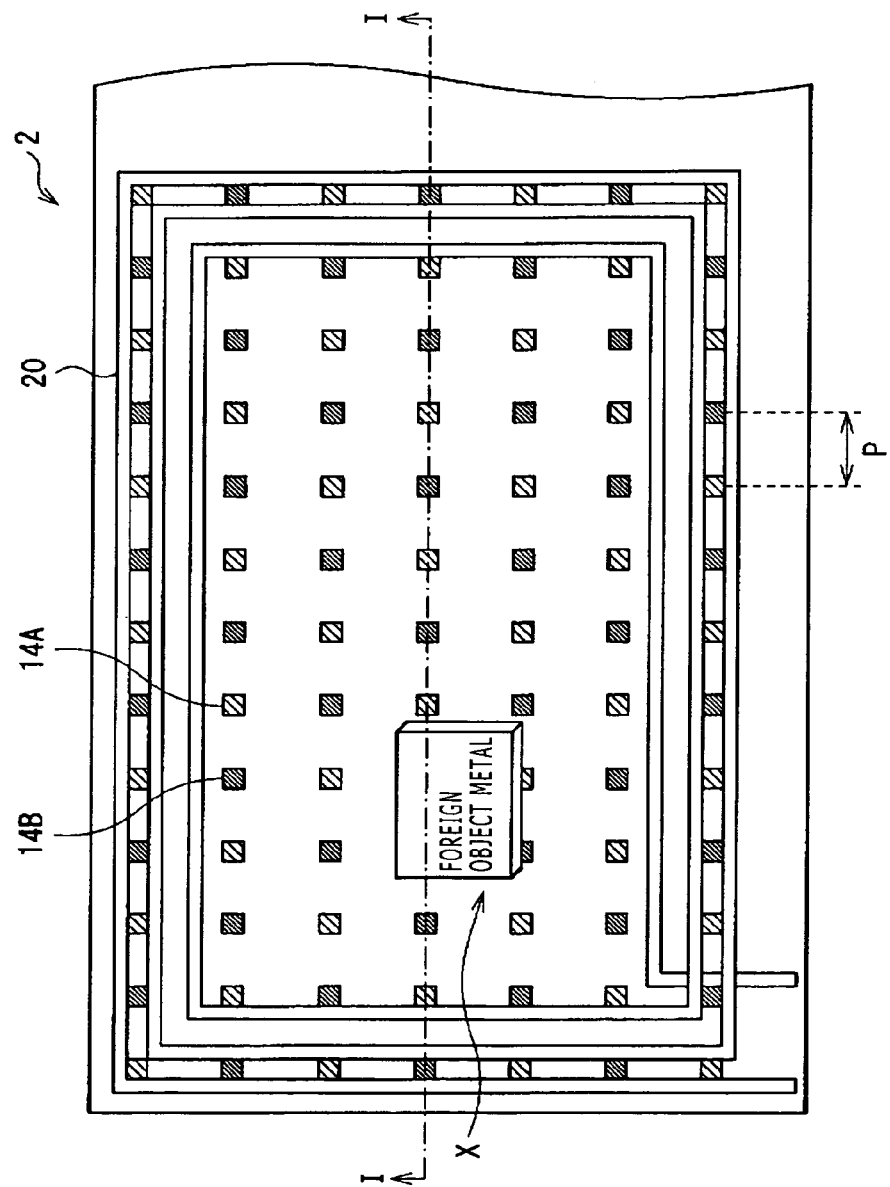
FIG. 2 is a top plan view of the mobile phone shown in FIG. 1.
Figure 3:
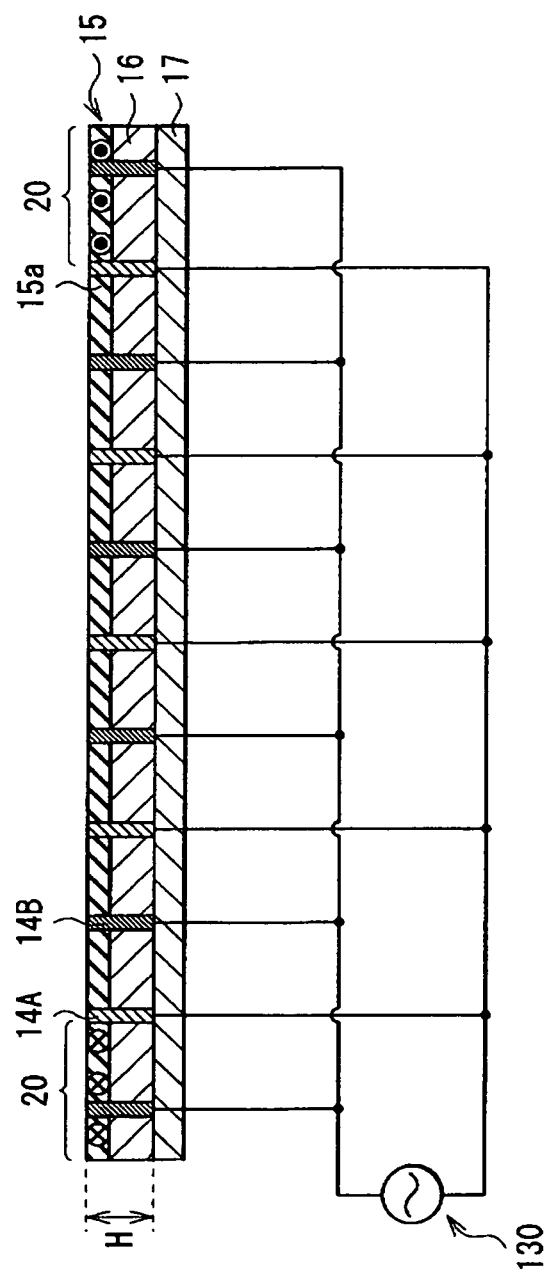
FIG. 3 is a cross sectional view of the mobile phone shown in FIG. 1.

FIG. 2 shows a planar structure of the mobile phone 2, and FIG. 3 is a cross sectional view taken on line I-I of FIG. 2. For example, the mobile phone 2 is structured in such a way that a magnetic material layer 16 and an antenna pattern layer 15 are laminated in order on a circuit substrate 17 in such a manner. The antenna pattern layer 15, the magnetic material layer 16, and the circuit substrate 17 correspond to a concrete example of "a power receiving portion" in the present disclosure. The antenna pattern layer 15 is preferably disposed on a side close to a surface of the mobile phone 2, and includes the secondary coil 20. The secondary coil 20 is wound by the predetermined number of winding. In this case, the secondary coil 20 is molded into a spiral shape along one surface of the mobile phone 2, and is buried in a resin layer 15a in the antenna pattern layer 15 (encased in the resin layer 15a). The surface of the secondary coil 20 either may be exposed from the resin layer 15a or may be covered with the resin layer 15a. In addition, the secondary coil 20 may also be provided on a substrate (not shown). It is only necessary to use a material which does not exert an influence on a line of magnetic force as a material used in substrate or the resin layer 15a. In addition, although not illustrated, the charging tray 1, for example, has a construction that both of a magnetic material layer and a resin layer are provided on a circuit substrate, and the primary coil 10 is buried in the resin layer.

The magnetic material layer 16 has a function of ensuring the magnetic isolation between the antenna pattern layer 15 and the circuit substrate 17. The magnetic material layer 16, for example, is made of a material having a high relative magnetic permeability such as an iron (Fe) series metal or a ferrite. In particular, the magnetic material layer 16 is preferably made of a material which is not magnetically saturated (hard to magnetically saturate).

The circuit substrate 17, for example, is an Integrated Circuit (IC) substrate, and has the circuit portion 21 including a detecting circuit 21A. Detailed configurations of the circuit portion 21 and the circuit portion 11 in the charging tray 1 will be described later.

An electrode pattern for detecting presence or absence of a foreign object metal X is formed in the mobile phone 2 as described above. Specifically, in the embodiment, plural positive electrodes 14A and plural negative electrodes 14B (plural sets of positive electrodes 14A and negative electrodes 14B) are regularly, discretely disposed along a row direction and a column direction. Plural positive electrodes 14A and plural negative electrodes 14B are alternately disposed (so as not to be adjacent to each other in the row direction and in the column direction).

When viewed from a surface parallel with a surface of the mobile phone 2 (a surface of the chassis 22), each of the positive electrodes 14A and the negative electrodes 14B has a point-like shape. Also, the positive electrodes 14A and the negative electrodes 14B are provided at a predetermined pitch P. The predetermined pitch P, for example, is in the range of about 5 to about 20 mm.

On the other hand, when viewed from a cross section perpendicular to the upper surface of the mobile phone 2, the positive electrodes 14A and the negative electrodes 14B, for example, are provided so as to penetrate at least parts of the antenna pattern layer 15 and the magnetic material layer 16 to be exposed to the surface side of the antenna pattern layer 15. That is to say, an external shape of each of the positive electrodes 14A and the negative electrodes 14B is a rod-like shape (pin-like shape) having a predetermined height H. In addition, the positive electrodes 14A and the negative electrodes 14B are preferably exposed from the surface as well of the mobile phone 2 (the surface of the chassis 22). A voltage is supplied from a predetermined voltage supplying section 130 (such as a battery 215 which will be described later) to each of the positive electrodes 14A and the negative electrodes 14B.

(Circuit Configuration)

Figure 4:
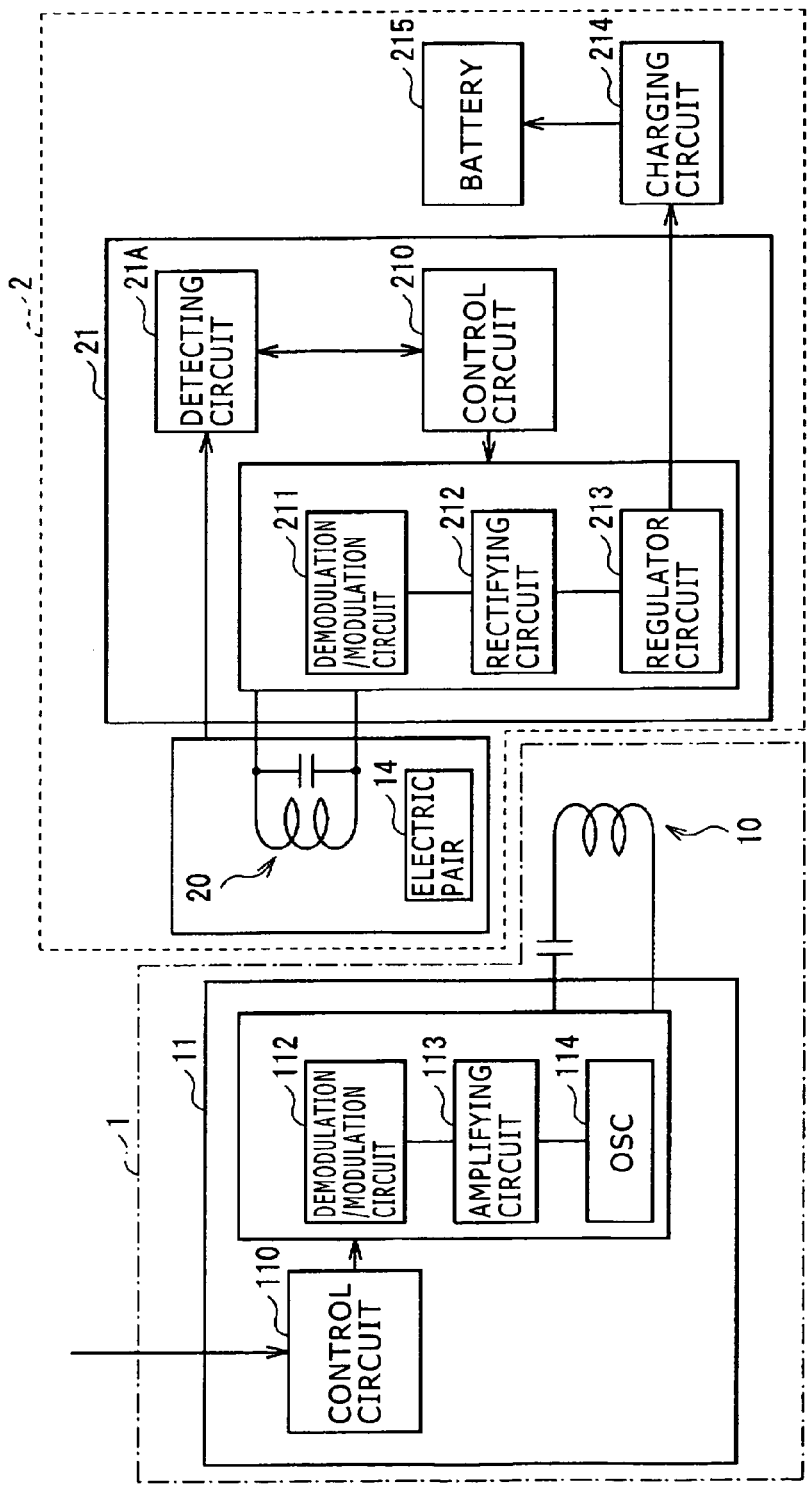
FIG. 4 is a functional block diagram of the charging tray and the mobile phone both shown in FIG. 1.

FIG. 4 is a functional block diagram of main constituent elements of the charging tray 1 and the mobile phone 2. The circuit portion 11 of the charging tray 1 includes a control circuit 110, a demodulation/modulation circuit 112, an amplifying circuit 113, and an oscillator (OSC) 114.

The control circuit 110 controls the driving of the demodulation/modulation circuit 112, the amplifying circuit 113, the OSC 114, and the alarm lamp 12 described above and, for example, is composed of a microcomputer. The control circuit 110 also supplies an AC electric power supplied from the AC power source 130 to the primary coil 10. Such a control circuit 110, for example, carries out the control: the starting (continuing) of the charging; and the stopping of the charging or the reducing of the supplied electric power (power) during the charging. It is noted that each of the control circuit 110 and the control circuit 210 which will be described later on the mobile phone 2 side may hold therein Identification (ID) information for authenticating (identifying) the primary coil 10 and the secondary coil 20 when the primary coil 10 and the secondary coil 20 come close to each other.

On the other hand, the circuit portion 21 of the mobile phone 2 includes a control circuit 210, the detecting circuit 21A, a demodulation/modulation circuit 211, a rectifying circuit 212, and a regulator circuit 213. The rectifying circuit 212 converts an AC electric power received from the charging tray 1 side into a DC (direct current) electric power. The regulator circuit 213 converts the DC electric power outputted thereto from the rectifying circuit 212 into a DC voltage as a predetermined voltage, thereby preventing the over-charging to the battery 215. The electric power taken out from the circuit portion 21, for example, is supplied to the battery 215 as a secondary battery by the charging circuit 214.

The control circuit 210 controls the driving of the detecting circuit 21A, the demodulation/modulation circuit 211, the rectifying circuit 212, and the regulator circuit 213 and, for example, is composed of a microcomputer. The control circuit 210 also carries out predetermined control in accordance with a detection result obtained by the detecting circuit 21A. Specifically, when the detection result shows "the foreign object metal is present," the control circuit 210 carries out the control for offering an alarm to the user by using some sort of alarm section (for example, by lightening the alarm light described above).

It is noted that when the detection result shows "the foreign object metal is present," the control circuit 210 may carry out the control in such a way that not only the alarm is offered to the user in the mobile phone 2 as described above, but also the supply of the electric power carried out in the charging tray 1 is automatically stopped, or the supplied electric power is automatically reduced (by utilizing some sort of information transmitting section). In addition, the charging tray 1 may also be provided with a lamp for the alarm offering as described above.

The detecting circuit 21A is a circuit for detecting presence or absence of the foreign object metal wedged between the mobile phone 2 and the charging tray 1. The detecting circuit 21A detects whether or not the foreign object metal is present in accordance with at least one parameter (electrical characteristics) of an impedance, a current, and a voltage developed across the positive electrode 14A and the negative electrode 14B which are obtained by applying a voltage across an electric pair 14 (the positive electrode 14A and the negative electrode 14B). Specifically, although details will be described later, the detecting circuit 21A holds therein a threshold value about an amount of change in at least one of the three parameters described above, and detects presence or absence of the foreign object by comparing an amount of change in the parameter obtained based on the applied voltage described above with the threshold value (i.e., in accordance with a magnitude relationship) between them. It is noted that the detecting circuit 21A corresponds to a concrete example of "a detecting portion" in the present disclosure.

[Operation]

(Non-contact Power Feeding Operation)

In the embodiment, in the charging tray 1, the control circuit 110, for example, applies an AC voltage to the primary coil 10 through the circuit portion 11 (including the control 110, the demodulation/modulation circuit 112, the amplifying circuit 113, and the OSC 114). As a result, the electromagnetic wave is radiated from the primary coil 10 toward the upper side of the charging tray 1 (the magnitude field is generated). At this time, when the mobile phone 2 as a power feeding object is placed on (or comes close to) the upper surface of the charging tray 1, the primary coil 10 provided in the charging tray 1, and the secondary coil 20 provided in the mobile phone 2 come close to each other in the vicinity of the upper surface of the charging tray 1. It is noted that the radiation of the electromagnetic wave in this case either may be carried out on a steady basis, or may be intermittently (fitfully) carried out along a time axis.

When the secondary coil 20 is disposed close to the primary coil 10 in which the magnetic field is being generated in such a way, an electromotive force is generated in the secondary coil 20 so as to be induced by the magnetic flux being generated in the primary coil 10. In other words, a line of magnetic force is generated so as to be interlinked with both of the primary coil 10 and the secondary coil 20 by the electromagnetic induction (or a magnetic sympathetic resonance, as the case may be). As a result, the electric power is fed from the primary coil 10 side to the secondary coil 20 side. In the mobile phone 2, the AC electric power received by the secondary coil 20 is converted into the predetermined DC electric power by the circuit portion 21 (including the control circuit 210, the demodulation/modulation circuit 211, the rectifying circuit 212, and the regulator circuit 213). The resulting DC electric power is supplied from the charging circuit 214 to the battery 215. The mobile phone 2 is charged with the electricity in such a way.

That is to say, in the embodiment, during the charging of the mobile phone 2, for example, it is unnecessary to connect the terminal to an AC adaptor or the like. Thus, by placing the mobile phone 2 on the upper surface of the charging tray 1 (by causing the mobile phone 2 to come close to the upper surface of the charging tray 1), it is possible to readily start the charging (carry out the non-contact power feeding). This leads to the lightening of the burden imposed on the charging work by the user. In addition, although not illustrated here, plural CE devices (electronic apparatuses) like the mobile phone 2 can be placed on the upper surface of the charging tray 1. As a result, the plural CE devices may be collectively charged with the electricity. In other words, the power feeding system may also be composed of the charging tray 1 and plural electronic apparatuses.

It is noted that in the case where the control circuit 10 of the charging tray 1, and the control circuit 210 of the mobile phone 2 hold therein the respective pieces of identification (ID) information for authenticating (identifying) the primary coil 10 and the secondary coil 20 when the primary coil 10 and the secondary coil 20 come close to each other, the two pieces of ID information may be exchanged for each other. Also, when the primary coil 10 and the secondary coil 20 can be properly authenticated through the exchange of the two pieces of ID information, the control circuit 110 may start (continue) to charge the mobile phone 2 with the electricity.
(Detection of Foreign Object Metal)

Now, in the power feeding system for feeding the electric power by utilizing the electromagnetic induction as described above, that is, by using the magnetic field, when the foreign object (foreign object metal) such as a coin is placed within the magnetic field being generated in the charging tray 1 (the primary coil 10), there is the possibility that an eddy current is generated, thereby heating the foreign object metal. In particular, when such a foreign object metal is wedged between the charging tray 1 and the mobile phone 2, the foreign object metal is easy to further heat.

Then, in the embodiment, in the mobile phone 2, the circuit portion 21 (specifically, the control circuit 210 and the detecting circuit 21A) detects presence or absence of such a foreign object metal and carries out the processing operations such as the alarm, charging stop, and reduction of the supplied electric power as described above in accordance with the detection result. Specifically, the detecting circuit 21A applies the voltage across the positive electrode 14A and the negative electrode 14B whose patterns are formed in the mobile phone 2 in accordance with the control made by the control circuit 210, and measures the predetermined parameter between the positive electrode 14A and the negative electrode 14B. With regard to the parameter, as described above, at least one of the impedance, the current, and the voltage may be used. Also, the detecting circuit 21A carries out the detection described above in accordance with an amount of change in the parameter.

For example, the detecting circuit 21A has a predetermined threshold value A1 (first threshold value), for example, for detection of the foreign object metal with respect to an amount of change in the parameter described above and detects presence or absence of the foreign object metal by using the threshold value A1. Specifically, the detecting circuit 21A detects presence or absence of the foreign object metal in accordance with the magnitude relationship between an amount of change in the parameter, and the threshold value A1.

Here, an example of the operation for detecting the foreign object is described with reference to FIGS. 5A and 5B. It is noted that in this case, the upper surface of the charging tray 1 is set as a surface S, and a state in which no object is placed on the surface S of the charging tray 1 is set as an OPEN state. In addition, the measurement about an amount of change in the parameter described above, and the setting of the threshold value A1 are carried out with the OPEN state as a reference. Although the parameter is described by exemplifying the impedance of the impedance, the current, and the voltage, this also applies to the case where either the current or the voltage is used. In addition, the judgment may also be carried out by multiply using these parameters. It is only necessary that the measurements about these parameters are carried out by using various kinds of measuring instrument such as an ammeter and a voltmeter both provided in a wiring circuit connected between the positive electrode 14A and the negative electrode 14B, and the measurement results obtained from the various kinds of measuring instrument are outputted to the detecting circuit 21A. Also, it is only necessary for the detecting circuit 21A to calculate an amount of change in the predetermined parameter based on the measured data, and to compare an amount of change thus calculated with the threshold value A1 previously set (make the comparison about the magnitude relationship).

As shown in FIG. 5A, in the OPEN state, the impedance Z is approximately equal to ∞ (infinity) (Z=Z0 is set in this case), and the capacitor C (a value of a capacitance component of the impedance Z) is approximately equal to 0 (zero) (a very small value). However, when a foreign object metal X is placed on the surface S (wedged between the surface S and the mobile phone 2), the foreign object metal X is disposed so as to straddle across a certain positive electrode 14A and a certain negative electrode 14B in this case. For this reason, either the electrical short-circuit (short) (in the case where the voltage applied across the positive electrode 14A and the negative electrode 14B is a DC voltage), or the capacitive coupling (in the case where the applied voltage is an AC voltage) is generated between the positive electrode 14A and the negative electrode 14B each facing the foreign object metal X. As a result, the impedance Z between the positive electrode 14A and the negative electrode 14B drops to Z1 (the capacitance C is increased to C1). Therefore, the detecting circuit 21A compares an amount B1 of change in the impedance Z at this time with the threshold A1 described above, and judges that "the foreign object metal is present" when an amount B1 of change in the impedance Z is equal to or larger than the threshold value A1.

On the other hand, in the case as well where the mobile phone 2 is placed on the surface S of the charging tray 1 (in the case as well where the foreign object metal X is absent between the surface S of the charging tray 1 and the mobile phone 2), since a metallic layer 2A (metallic member) including both of the coil and the circuit substrate is present in the mobile phone 2, similarly to the case of the foreign object metal X described above, some change is generated in the impedance Z or the capacitance C. However, an amount of change in this case (an amount B2 of change in the impedance Z or the capacitance C), as shown in FIGS. 5A and 5B, becomes very smaller than the amount B1 of change in the foreign object metal X (Z0>Z2>>Z1). The reason for this is because the metallic layer 2A is provided inside the chassis 22 made of the resin or the like in the CE device such as the mobile phone 2, and thus the CE device is disposed away from the surface S by at least a thickness, d1, of the chassis 22. Therefore, it is easy to set the threshold value A1 used to distinguish the amount B1 of change when the foreign object metal X is present between the charging tray 1 and the mobile phone 2, and the amount B2 of change when the foreign object metal X is absent between the charging tray 1 and the mobile phone 2 from each other. Thus, the foreign object metal X, and the mobile phone 2 as an object of the power feeding can be precisely sorted out (mal-judgment is hard to be caused) by using the threshold value A1.

In such a way, in the embodiment, the detecting circuit 21A applies the voltage across the positive electrode 14A and the negative electrode 14B which are formed into the predetermined pattern. Also, the detecting circuit 21A detects presence or absence of the foreign object metal X in accordance with an amount of change in the parameter such as the impedance, the current or the voltage caused by application of the voltage. Also, when it is detected that the foreign object is present, the control circuit 210 immediately carries out the control for offering the alarm to the user by using some sort of alarm section (for example, by lightening the alarm lamp described above). As a result, the user who has received the alarm, for example, can take some sort of measures: the mobile phone 2 is taken off from the surface S of the charging tray 1, thereby stopping the charging; and the foreign object metal X is removed. It is noted that when the foreign object metal X is present, the control may be carried out in such a way that not only as described above, the alarm is offered from the mobile phone 2 to the user, but also the feeding of the electric power to the primary coil 10 in the charging tray 1 is automatically stopped or the supplied electric power is automatically reduced (by utilizing some sort of command transmitting section). In addition, the charging tray 1 may be provided with the lamp for offering of the alarm as described above.

(Operation by Electrode Pattern)

Figure 6:
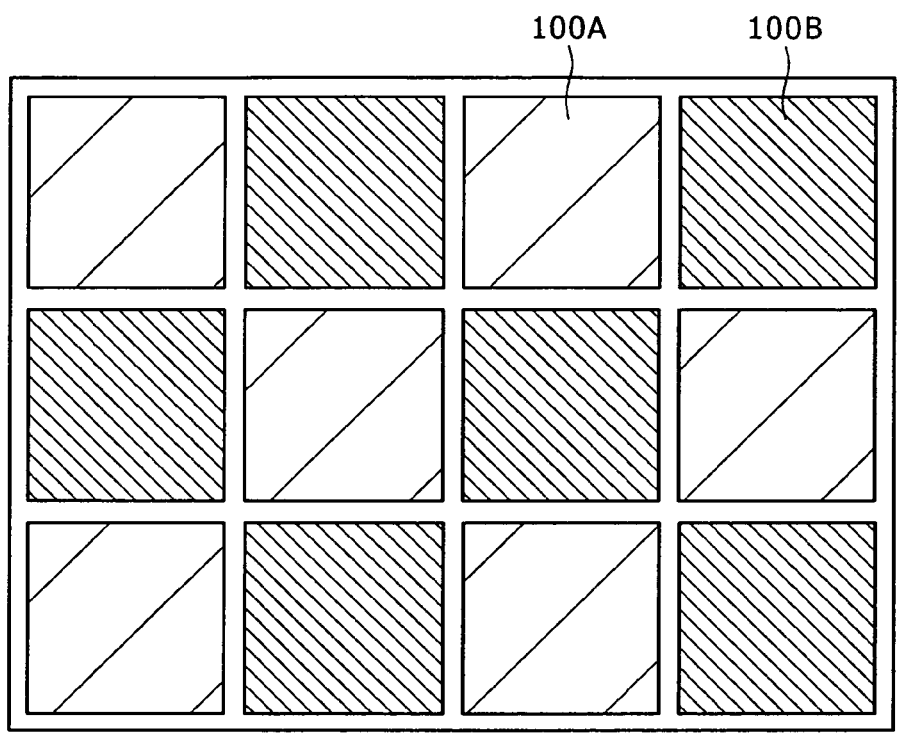
FIG. 6 is a top plan view of an electrode pattern of Comparative Example.

Now, in the embodiment, the foreign object metal X is detected by utilizing the generation of either the electrical short-circuit or the capacitive coupling (hereinafter referred to as "the electrical short-circuit or the like" for short) in the electrical pattern (between the positive electrode 14A and the negative electrode 14B) formed in the mobile phone 2 as described above. Here, a concrete operation based on the shape of the electrode pattern will be described below. FIG. 6 schematically shows a planar shape of an electrode pattern according to Comparative Example for the embodiment. In Comparative Example, plural positive electrodes 100A and plural negative electrodes 100B are alternately disposed separately from each other in terms of an electrode pattern. In this case, each of the positive electrodes 100A and the negative electrodes 100B is formed as a so-called solid electrode having a planar shape. Such plural sets of positive electrodes 100A and the negative electrode 100B are disposed, which results in that the detection of the foreign object as described above becomes possible by utilizing the electrical short-circuit or the like generated due to the presence of the foreign object metal X.

On the other hand, in the embodiment, as described above, the positive electrode 14A and the negative electrode 14B each have the point-like shape within the surface parallel with the surface of the mobile phone 2, and are disposed discretely from one another. By adopting such a structure, the eddy current is harder to generate in the embodiment than in Comparative Example described above. Thus, the line of magnetic force (magnetic flux) generated in the antenna pattern layer 15 can be formed in a direction interlinked with the primary coil 10 and the secondary coil 20.

In addition, the positive electrodes 14A and the negative electrodes 14B each have the point-like shape in terms of a plane, but the positive electrodes 14A and the negative electrodes 14B each have the pin-like shape when viewed in terms of a cross section. That is to say, the positive electrodes 14A and the negative electrodes 14B penetrate both of the antenna pattern layer 15 and the magnetic material layer 16. The provision of the magnetic material layer 16 makes it possible to prevent the line of magnetic force generated in the secondary coil 20 of the antenna pattern layer 15 from being transmitted to the lower surface side of the circuit substrate 17, thereby preventing the circuit substrate 17 from becoming hot.

As described above, in the embodiment, the mobile phone 2 is provided with the detecting circuit 21A for detecting the foreign object metal X, which results in that when it is detected that the foreign object is present, it is possible to take measures: the effect that it is detected that the foreign object is present is alarmed; and the charging of the electronic apparatus is stopped or reduced. For example, the positive electrodes 14A and the negative electrodes 14B are disposed into the predetermined pattern on the surface side of the mobile phone 2, and the voltage is applied across the positive electrodes 14A and the magnetic electrodes 14B. As a result, when the foreign object metal X is present in the area straddling across the positive electrodes 14A and the magnetic electrodes 14B, the electrical short-circuit or the like is generated between these electrodes 14A and 14B, thereby changing the parameters such as the impedance. Therefore, the detecting circuit 21 can detect presence or absence of the foreign object metal (whether or not the foreign object metal X is wedged between the charging tray 1 and the mobile phone 2) by comparing an amount of change in such a parameter with the predetermined threshold value A1 for detection of the foreign object metal. In addition, an amount of change in the parameter is sufficiently larger than an amount of change when the foreign object metal X is not wedged between the charging tray 1 and the mobile phone 2. Therefore, the foreign object metal X and the mobile phone 2 can be readily sorted out by using the threshold value Al. Also, when the foreign object metal X is detected, the measures such as the alarming are immediately taken, thereby making it possible to carry out the attention-seeking for the user, which leads to prevention of the heating of the foreign object metal X. Therefore, when the power feeding is carried out by using the magnetic field, the foreign object (the foreign object metal X) can be precisely detected, thereby preventing the anomalous heating.

Hereinafter, Modification Examples (Modification Examples 1 to 6) of the embodiment described above will be described. It is noted that the same constituent elements as those of the embodiment described above are designated by the same reference numerals or symbols, respectively, and a description thereof is suitably omitted here for the sake of simplicity.

Modification Example 1

FIGS. 7A and 7B are respectively schematic views explaining the foreign object metal detecting operation according to Modification Example 1. The foreign object metal detecting operation of Modification Example 1 is such that presence or absence of the foreign object metal is detected by comparing an amount of change in the predetermined parameter with the predetermined threshold value (by carrying out the comparison about the magnitude relationship) similarly to the case of the foreign object metal detecting operation of the embodiment described above. However, in Modification Example 1, either even when the surface of the foreign object metal X is oxidized, or even when a plating treatment is carried out for the surface of the foreign object metal X, the detection can be precisely carried out.

Specifically, in Modification Example 1, the detecting circuit 21A has a threshold value A2 (second threshold value) (smaller than the threshold value A1 in this case) different from the threshold A1 in addition to the threshold value A1. The threshold value A2 is used to detect the foreign object metal X whose surface has an oxide or a plated film (assigned as a thin film Y) formed thereon. Thus, the threshold value A2 is set in consideration that the foreign object metal X is disposed away from the surface of the mobile phone 2 by a thickness, d2, of the thin film Y. An amount of change B1' in an impedance Z1' when the foreign object metal X has the thin film Y formed thereon, as shown in FIGS. 7A and 7B, becomes smaller than an amount B1 of change in the impedance when the foreign object metal X has no thin film Y, but becomes sufficiently larger than an amount B2 of change in the impedance due to presence of the mobile phone 2 similarly to the case of the above case (Z1<Z1'<<Z2).

Therefore, the detecting circuit 21A detects presence or absence of the foreign object metal X by using the threshold value A2 (A1>A2) set in consideration of the thickness, d2, of the thin film Y in addition to the threshold value A1, in other words, detects presence or absence of the foreign object metal X in consideration of the magnitude relationship as well between an amount of change in the parameter, and the threshold value A2, thereby obtaining the following effects. That is to say, the same effects as those of the embodiment described above are obtained, and also the precise detection becomes possible even when the thin film such as the oxide film or the plated film is formed on the surface of the foreign object metal X. In addition, the AC voltage is used as the applied voltage, which results in that the detection of the foreign object metal X having such a thin film Y formed therein can be precisely carried out. As a result, a metal such as a stainless steel which is easy to oxidize can also be satisfactorily detected.

Modification Example 2

Figure 8A:
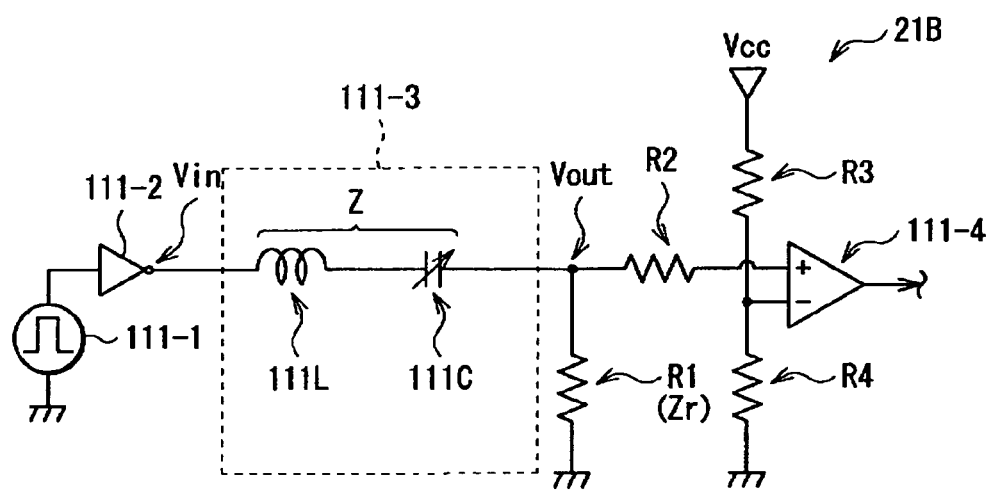
FIGS. 8A and 8B are respectively a circuit diagram of a detecting circuit of Modification Example 2, and a circuit diagram of a resonance circuit used instead of using the detecting circuit shown in FIG. 8A.

FIG. 8A is a circuit diagram showing a detecting circuit (a detecting circuit 21B) according to Modification Example 2 of the embodiment described above. The detecting circuit 21B includes an AC signal source 111-1, an inverter circuit (logical NOT circuit) 111-2, a resonance circuit 111-3, resistors R1, R2, R3, and R4, and a comparator 111-4.

The AC signal source 111-1 is a signal source (oscillation source) for outputting an AC signal having a predetermined frequency (a resonant frequency f0 which will be described later). The inverter circuit 111-2 is a circuit for outputting a logical NOT signal of the AC signal inputted thereto from the AC signal source 111-1.

The resonance circuit 111-3 is composed of an inductor 111L (inductance component) and a capacitor element 111C (capacitance component). Specifically, the resonance circuit 111-3 is a serial resonance circuit (LC serial resonance circuit) in which the inductor 111L and the capacitor element 111C are connected in series with each other. That is to say, one terminal of the inductor 111L is connected to an output terminal of the inverter circuit 111-2, and the other terminal thereof is connected to one terminal of the capacitor element 111C. Here, the capacitor element 111C is a (variable) capacitor element formed between the potential electrode (such as the positive electrode 14A described above) and the negative electrode (such as the negative electrode 14B described above) in the charging tray 1.

Figure 8B:
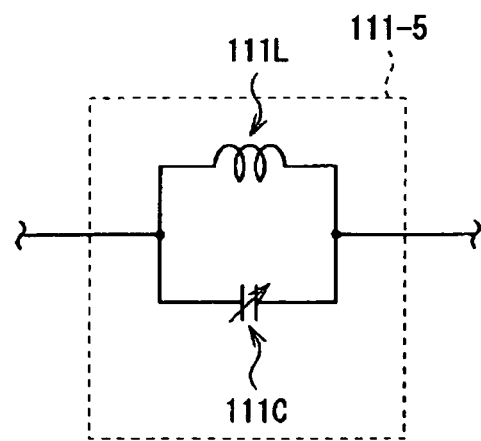

It is noted that in the detecting circuit 21B, another resonance circuit which will be described below may also be used instead of using the resonance circuit 111-3 as such a serial resonance circuit. Specifically, for example, a resonance circuit 111-5 as a parallel resonance circuit (LC parallel resonance circuit), for example, as shown in FIG. 8B may be used. Such a resonance circuit 111-5 is also composed of the inductor 111L and the capacitor element 111C described above.

In such a resonance circuit 111-3 or 111-5, the inductor 111L and the capacitor element 111C are made to resonate with each other in the manner which will be described later at a resonant frequency f0 regulated by Expression (1). As a result, an output voltage Vout is generated based on an input Vin shown in FIG. 8A and is then outputted.

$$f0 = 1/2\pi\sqrt{LC} \qquad (1)$$

One terminal of a resistor R1 (having an impedance value Zr) is connected to each of the other terminal of the capacitor element 111C and one terminal of a resistor R2, and the other terminal of the resistor R1 is grounded. The other terminal of the resistor R2 is connected to a positive input terminal of a comparator 111-4. One terminal of a resistor R3 is connected to a predetermined power source Vcc, and the other terminal thereof is connected to each of one terminal of a resistor R4 and a negative input terminal of the comparator 111-4. The other terminal of the resistor R4 is grounded.

The comparator 111-4 is a circuit for comparing a voltage inputted to the positive input terminal (a voltage corresponding to the output voltage Vout described above) with a predetermined constant voltage (threshold voltage) inputted to the negative input terminal to detect a magnitude relationship between these voltages, and outputting a comparison result (corresponding to a result of detection of the foreign object metal X) from an output terminal.

Figure 9A:
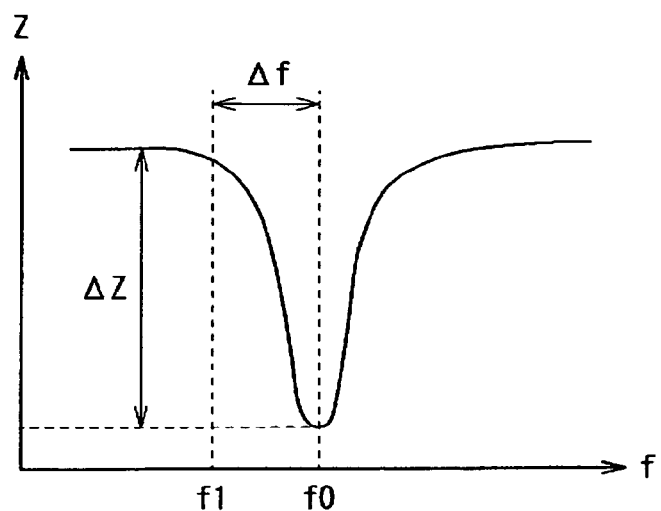
FIGS. 9A and 9B are respectively a characteristic diagram representing an example of a relationship between a frequency of an AC power source and an impedance, and a characteristic diagram representing an example of a relationship (resonance characteristics) between the frequency of the AC power source and an output voltage from a resonance circuit.
Figure 9B:
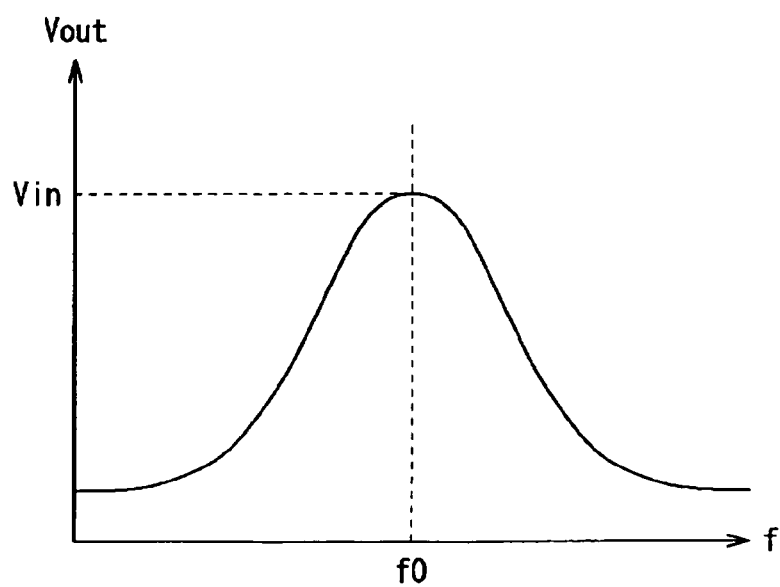

Here, in the detecting circuit 21B, the change in the impedance is increased by utilizing the resonance circuit 111-3 (or the resonance circuit 111-5, as the case may be) described above. Specifically, the resonance circuit 111-3 has a resonant frequency f0 peculiar thereto as shown in FIGS. 9A and 9B. In this case, a value of the impedance Z of the resonance circuit 111-3 and a value of the output voltage Vout from the resonance circuit 111-3 largely differ between the frequency in the vicinity of the resonant frequency f0, and a frequency band except for the resonant frequency f0. For example, a difference ΔZ with respect to the value of the impedance Z occurs between the resonant frequency f0 and a frequency f1 different from the resonant frequency f0 by a frequency width Δf. For this reason, the output voltage Vout gets a value expressed by Expression (2) in a phase of non-resonance (for example, at the frequency f1 described above), while it gets a value expressed by Expression (3) in a phase of resonance (at the frequency f0):

$$Vout=Zr/(Z+Zr)\times Vin \text{ (in phase of non-resonance)} \quad (2)$$

$$Vout=Vin \text{ (in phase of resonance)} \quad (3)$$

In such a way, the detecting circuit 21B detects the foreign object based on a large amount of change in the parameter shown in FIGS. 9A and 9B (an amount of change corresponding to the width ΔZ in the impedance Z, or an amount of change corresponding to a difference in the output voltage Vout expressed by Expressions (2) and (3) described above) by utilizing the resonance circuit 111-3. Specifically, firstly, the frequency of the AC signal outputted from the AC signal source 111-1 is previously set to the resonant frequency f0, thereby causing the resonance. Also, the resonance is stopped by utilizing a change in the capacitance value (the capacitance value C described above) of the capacitor element 111C corresponding to presence or absence of the foreign object metal X (that is, a change in the impedance Z), thereby obtaining a large value of the parameter (the impedance Z or the output voltage Vout). As a result, when presence or absence of the foreign object metal X is judged in the comparator 111-4, it is possible to increase the detection sensitivity.

Therefore, in Modification Example 2, for example, even when an amount of change in the capacitance corresponding to presence or absence of the foreign object metal X in the capacitor element 111C is minute (for example, about several picofarads), an amount of change in such a parameter can be largely increased by utilizing the resonance. Therefore, the sensitivity of detection of the foreign object metal X can be increased (the mal-detection can be reduced) as compared with the case of the embodiment described above.

It is noted that when presence or absence of the foreign object metal X is detected by using the AC signal having the predetermined frequency as with Modification Example 2, preferably, the detecting circuit 21B uses the signal having the frequency (the resonant frequency f0 in this case) different from the frequency during the electric power transmission (power feeding). The reason for this is because such a case results in that it is possible to reduce the noises due to the frequency during the electric power transmission (it is possible to increase the S/N ratio).

Modification Example 3

Figure 10:
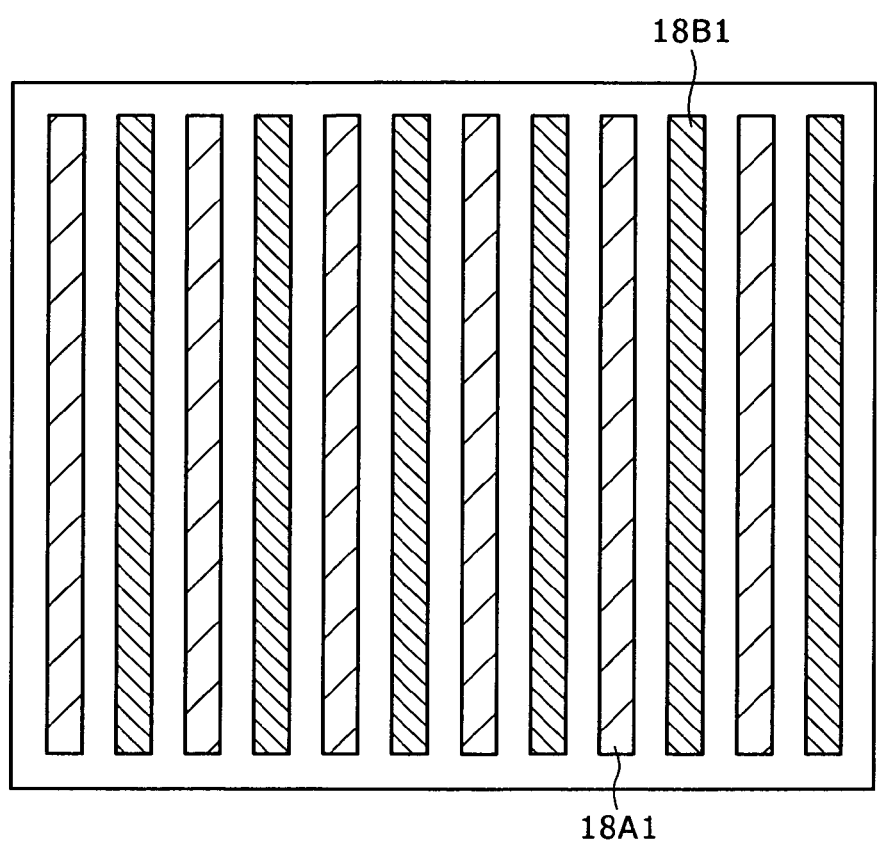
FIG. 10 is a top plan view showing an example of an electrode pattern of Modification Example 3.

FIG. 10 shows an example of a planar structure of an electrode pattern according to Modification Example 3 of the embodiment. In the embodiment described above, the case where the positive electrodes 14A and the negative electrodes 14B each have the point-like shape (the pin-like shape as a whole) in terms of planar view is exemplified as the electrode pattern for detection of the foreign object metal X. However, the present disclosure is by no means limited to such a point-like shape, and thus the electrode pattern may also adopt a line-like shape. In this case, it is only necessary that plural positive electrode 18A1 and plural negative electrodes 18B1 (plural sets of positive electrode 18A1 and negative electrodes 18B1) are alternately disposed away from one another so as to extend in a direction along a direction perpendicular to the extension direction in terms of planar view. However, similarly to the case of the embodiment described above, preferably, each of the positive electrode 18A1 and the negative electrodes 18B1 is provided so as to perfectly penetrate both of the antenna pattern layer 15 and the magnetic material layer 16 in terms of a cross section. That is to say, the entire shape (external shape) of each of the positive electrode 18A1 and the negative electrodes 18B1 is a thin plate-like shape, and each of the positive electrode 18A1 and the negative electrodes 18B1 is disposed on such a direction that a width direction of the thin plate-like shape is perpendicular to the upper surface of the charging tray 1. Even in such a structure, similarly to the case of the embodiment described above, presence or absence of the foreign object metal X can be detected by using the situation that the electrical short-circuit or the like is generated between the electrodes 18A1 and 18B1.

Figure 11:
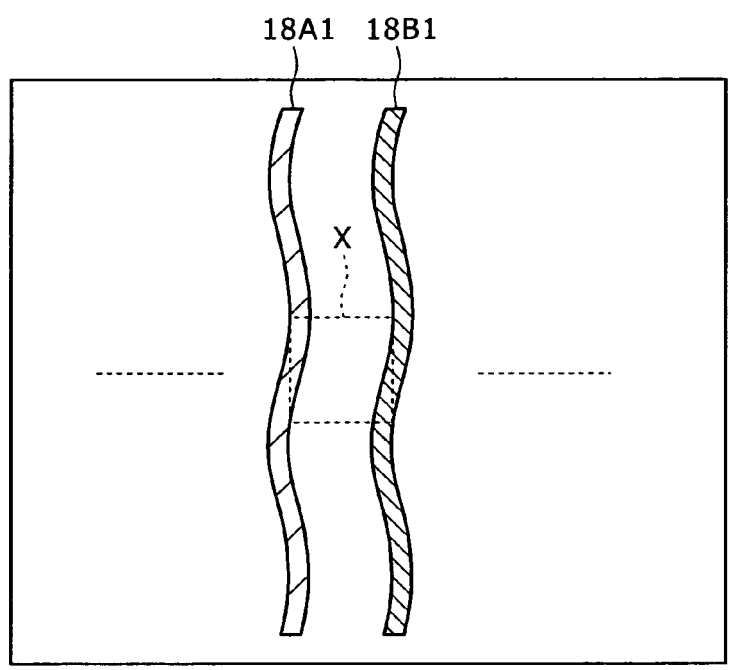
FIG. 11 is a top plan view showing another example of the electrode pattern of Modification Example 3.

It is noted that when each of the positive electrodes 18A1 and the negative electrodes 18B1 has the line-like shape, for example, as shown in FIG. 11, each of the positive electrodes 18A1 and the negative electrodes 18B1 may have a wave-like (wave line) shape. As a result, the foreign object metal X becomes easy to dispose so as to straddle across the positive and negative electrodes 18A1 and 18B1, and the foreign object metal X is easy to detect as compared with the case of the straight line shape as shown in FIG. 10.

Modification Example 4

Figure 12:
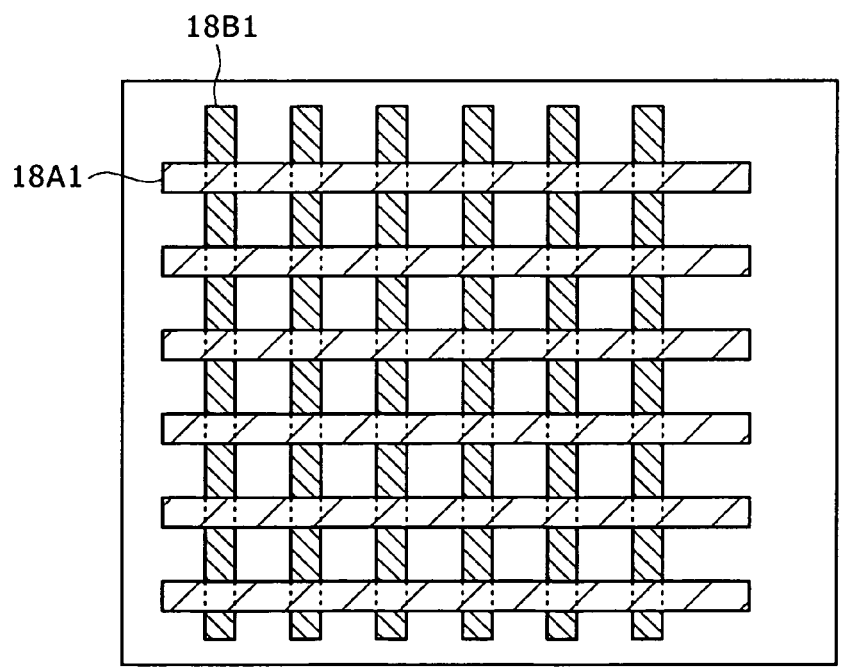
FIG. 12 is a top plan view showing an electrode pattern of Modification Example 4.

Or, for example, as shown in FIG. 12, plural positive electrodes 18A1 and plural negative electrodes 18B1 may also be disposed in a lattice-like pattern as a whole. In this case, however, lattice points (lattice-like intersections) are formed so that the positive electrode 18A1 themselves and the negative electrodes 18B1 themselves are electrically insulated from each other.

Modification Example 5

Figure 13:
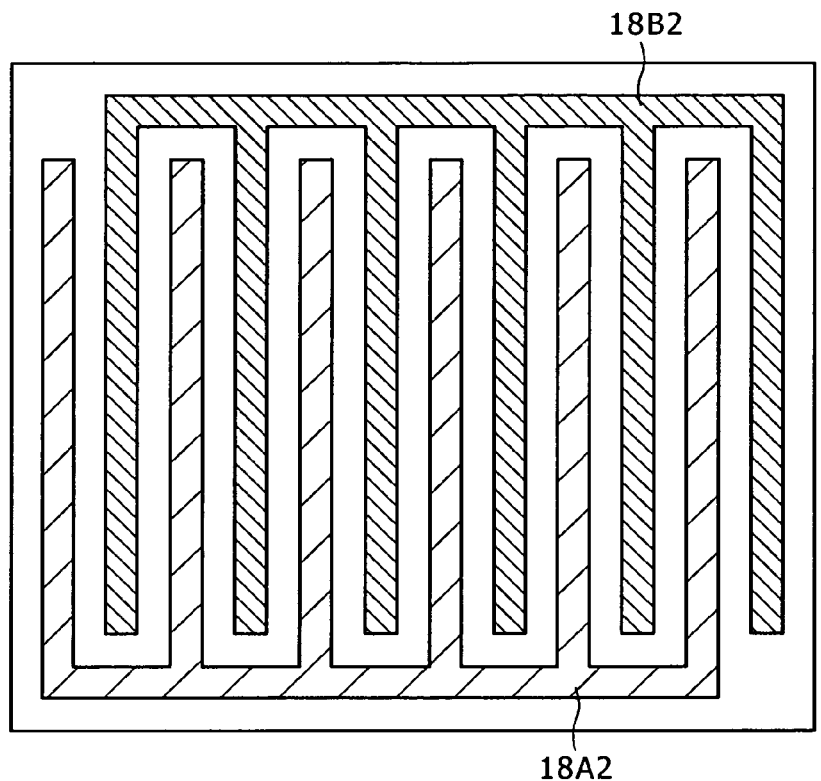
FIG. 13 is a top plan view showing an example of an electrode pattern of Modification Example 5.

FIG. 13 shows a planar structure of an electrode pattern according to Modification Example 5 of the embodiment. With regard to the electrode pattern for detection of the foreign object metal X, in addition to the point-like (pin-like) pattern, line-like (thin plate-like) pattern, and the lattice-like pattern as described above, a comb teeth-like electrode may also be adopted as with Modification Example 5, In this case, for example, a positive electrode 18A2 and a negative electrode 18B2 each having a comb teeth-like shape (a set of positive electrode 18A2 and negative electrode 18B2) are disposed so as to be engaged with each other without contacting each other in terms of planar view. However, similarly to the embodiment described above, each of the positive electrode 18A2 and the negative electrode 18B2 is provided so as to penetrate both of the antenna pattern layer 15 and the magnetic material layer 16 in terms of the cross section. Also, the positive electrode 18A2 and the negative electrode 18B2 have such a structure as to have a thickness in a direction perpendicular to the upper surface of the charging tray 1. By adopting such a structure, similarly to the case of the embodiment described above, presence or absence of the foreign object metal X can be detected by using the situation that the electrical short-circuit or the like is generated between the electrodes 18A2 and 18B2. In addition, since a pair of positive electrode 18A2 and negative electrode 18B2 has only to be driven, it is possible to simplify a wiring layout or the like in the circuit substrate 17.

It is noted that the electrode pair composed of the positive electrode 18A2 and the negative electrode 18B2 is by no means limited to one pair, but plural pairs may also be provided. For example, plural pairs of positive electrodes 18A2 and negative electrodes 18B2 may also be provided along a row direction and a column direction. As a result, it is possible to suppress a parasitic capacitance component between the electrodes.

Modification Example 6

Figure 14:
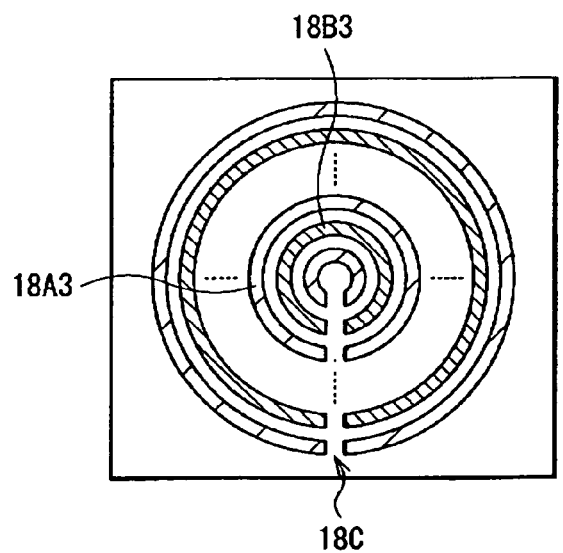
FIG. 14 is a top plan view showing an example of an electrode pattern of Modification Example 6.

FIG. 14 shows a planar structure of an electrode pattern according to Modification Example 6 of the embodiment. With regard to the electrode shape for detection of the foreign object material X, in addition to the electrode shapes which have been described until now, an approximately annular electrode having a cutout (a slit 18C) may also be adopted as with Modification Example 6. Specifically, in Modification Example 6, positive electrodes 18A3 and negative electrodes 18B3 each having the slit 18C in parts thereof are disposed alternately, concentrically, and away from each other. Even in such a structure, similarly to the case of the embodiment described above, presence or absence of the foreign object metal X can be detected by using the situation that the electrical short-circuit or the like is generated between the electrodes.

Note that, a structure may also be adopted such that plural sets of positive electrodes 18A3 and negative electrodes 18B3 are used as a unit, and plural units are also be two-dimensionally disposed.

Although the present disclosure has been described so far by exemplifying the embodiment and Modification Examples 1 to 6 thereof, the present disclosure is by no means limited thereto and thus various kinds of changes can be made. For example, the materials, the thicknesses and the like of the layers in the embodiment described above are by no means limited, and thus any other suitable material and thickness may also be adopted for the layers described above.

In addition, in the above embodiment and the like, the charging tray 1 for the small CE device such as the mobile phone 2 is exemplified as the power feeding apparatus in the present disclosure. However, the power feeding apparatus in the present disclosure is by no means limited to such a charging tray 1 for home use, and thus can be applied as a charger for various kinds of electronic apparatuses. In addition, the power feeding apparatus is not necessarily constructed in the form of a tray. For example, the power feeding apparatus may also be constructed in the form of a stand for an electronic apparatus such as a so-called cradle.

Moreover, in the above embodiment and the like, the case where the AC voltage is applied across the positive electrode and the negative electrode is exemplified. However, the voltage applied across the positive electrode and the negative electrode is by no means limited to the AC voltage, but the DC voltage may also be used as the applied voltage. However, when the foreign object metal on the surface of which the oxide film or the plated film is formed is intended to be detected, preferably, as described above, the AC voltage is used as the applied voltage.

In addition thereto, the operation for detecting the foreign object based on the magnitude relationship between an amount of change in the parameter and the threshold value is by no means limited to the technique described in the above embodiment and the like. For example, when an amount of change in the parameter is smaller than the threshold value, it may be judged that the foreign object is present depending on the parameters. In addition, the threshold value at this time may not be a predetermined fixed value, but, for example, may be a variable value which changes in accordance with the automatic control corresponding to either a manipulation made by the user or a use situation.

In addition, in the above embodiment and the like, the charging tray 1 is connected to the external AC power source by using the power source plug. In addition thereto, however, the charging tray 1 may receive the supply of the electric power from the outside by, for example, utilizing a Universal Serial Bus (USB) power source or an AC adaptor.

In addition, in the above embodiment and the like, when it is detected that the foreign object metal X is present, the alarm is offered to the user by lightening the alarm lamp in the mobile phone 2. In addition thereto, however, image display made on a display screen, an alarm sound or the like may also be used as the alarm offering section.

In addition thereto, although in the above embodiment and the like, the spiral-shaped secondary coil 20 formed along one surface of the mobile phone 2 is exemplified as the power receiving portion in the present disclosure, the coil shape is by no means limited thereto. For example, the coil may also be molded in a helical fashion, and thus may have a predetermined thickness in a direction perpendicular to the upper surface of the mobile phone 2.

Moreover, although the above embodiment and the like are described by concretely giving the constituent elements of the mobile phone 2, the mobile phone 2 needs not to include all of the constituent elements, and may also further include any other suitable constituent element.

In addition, although the above embodiment and the like are described by exemplifying the case where a pair of electrodes is disposed, and the foreign object is detected by applying the voltage across the paired electrodes, the present disclosure is by no means limited to the detecting technique utilizing such electrodes. For example, it is also possible to utilize a detecting technique utilizing a temperature sensor, a pressure sensor, a permanent magnet or the like. For example, when the temperature sensor is utilized, the temperature sensor is provided either on the surface of or inside the electronic apparatus such as the mobile phone, and a temperature in the circumference of the electronic apparatus is detected by using the temperature sensor. Here, when the foreign object is present between the charging tray and the temperature sensor, it is expected that the heat generation occurs, and thus the temperature in the circumference of the electronic apparatus becomes a high temperature. Therefore, it is only necessary that a temperature threshold for detection of the foreign object is previously set, and when the temperature detected by using the temperature sensor becomes equal to or higher than the temperature threshold, it is judged that the foreign object is present.

The present disclosure contains subject matter related to that disclosed in Japanese Priority Patent Application JP 2010-232814 filed in the Japan Patent Office on Oct. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic apparatus comprising:
a magnetic material layer between a substrate and an antenna pattern layer;
windings of a coil within said antenna pattern layer;
a plurality of positive electrodes and a plurality of negative electrodes disposed on said substrate to penetrate said magnetic material layer and said antenna pattern layer, wherein said windings surround said plurality of positive electrodes;

wherein said electronic apparatus is charged from a power feeding apparatus based on a pairing of said coil and a coil of said power feeding apparatus;

wherein presence of a foreign object disposed between the electronic apparatus and said power feeding apparatus is determined based on a change of at least one of an impedance, a current and a voltage developed across a positive electrode of said plurality of positive electrodes and a negative electrode of said plurality of negative electrodes corresponding to a voltage applied between said positive electrode and said negative electrode.

2. The electronic apparatus according to claim 1, wherein said magnetic material layer touches said substrate and said antenna pattern layer.

3. The electronic apparatus according to claim 1, wherein said antenna pattern layer is a resin layer.

4. The electronic apparatus according to claim 1, wherein said substrate is an integrated circuit.

5. The electronic apparatus according to claim 1, wherein said magnetic material layer has a high magnetic permeability.

6. The electronic apparatus according to claim 1, wherein said magnetic material layer is a material selected from the group consisting of an iron series metal and a ferrite.

7. The electronic apparatus according to claim 1, wherein said magnetic material layer is configured to provide magnetic isolation between said antenna pattern layer and said substrate.

8. The electronic apparatus according to claim 1, wherein said plurality of positive electrodes touch said substrate.

9. The electronic apparatus according to claim 1, further comprising:
a circuit portion configured to detect said presence of said foreign object between said antenna pattern layer and said power feeding apparatus, wherein said power feeding apparatus is configured to electrically charge the electronic apparatus.

10. The electronic apparatus according to claim 9, wherein said circuit portion is within said substrate.

11. The electronic apparatus according to claim 9, wherein the electronic apparatus is connectable to said power feeding apparatus.

12. The electronic apparatus according to claim 9, wherein said circuit portion is configured to apply said voltage across said plurality of positive electrodes and said plurality of negative electrodes.

13. The electronic apparatus according to claim 12, wherein said plurality of negative electrodes touch said substrate.

14. The electronic apparatus according to claim 12, wherein said windings surround said plurality of the negative electrodes.

15. A power feeding system comprising:
the electronic apparatus according to claim 9;
wherein said power feeding apparatus is configured to wirelessly transmit an electromagnetic wave to the electronic apparatus.

16. The power feeding system according to claim 15, wherein said coil is configured to receive said electromagnetic wave.

17. The power feeding system according to claim 15, wherein identification information is exchanged between said power feeding apparatus and the electronic apparatus, said identification information being used to authenticate said power feeding apparatus and the electronic apparatus.

18. The electronic apparatus according to claim 1, wherein said plurality of negative electrodes and said plurality of positive electrodes are alternately arranged at a predetermined pitch.

19. The electronic apparatus according to claim 1, wherein said plurality of negative electrodes and said plurality of positive electrodes are rod-shaped.

20. The electronic apparatus according to claim 1, wherein said plurality of negative electrodes and said plurality of positive electrodes are of a predetermined height in a direction of penetration into said magnetic material layer and said antenna pattern layer.

21. The electronic apparatus according to claim 1,
wherein said coil within said antenna pattern layer has a predetermine number of windings.

22. The electronic apparatus according to claim 1, wherein presence of said foreign object is based on a comparison of said change of at least one of said impedance, said current or said voltage with a threshold value.

23. The electronic apparatus according to claim 1, wherein said plurality of positive electrodes and said plurality of negative electrodes are arranged in a lattice-like pattern.

24. The electronic apparatus according to claim 1, wherein said plurality of positive electrodes and said plurality of negative electrodes are arranged in a comb teeth-like structure.

25. The electronic apparatus according to claim 1, wherein said plurality of positive electrodes and said plurality of negative electrodes are annular shaped, and
wherein said plurality of positive electrodes and said plurality of negative electrodes are concentrically arranged.

* * * * *